US012582977B2

(12) United States Patent
Han et al.

(10) Patent No.: US 12,582,977 B2
(45) Date of Patent: Mar. 24, 2026

(54) NOBLE METAL NANOCLUSTER CATALYSTS FOR OXYGEN EVOLUTION REACTION AND WATER SPLITTING SYSTEM USING THE SAME

(71) Applicant: SK INNOVATION CO., LTD., Seoul (KR)

(72) Inventors: Hyun Su Han, Daejeon (KR); Ju Hwan Im, Daejeon (KR); Hee Soo Kim, Daejeon (KR); Tae Hong Seok, Daejeon (KR); Seung Ok Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 604 days.

(21) Appl. No.: 18/188,459

(22) Filed: Mar. 23, 2023

(65) Prior Publication Data

US 2023/0330655 A1      Oct. 19, 2023

(30) Foreign Application Priority Data

Apr. 14, 2022      (KR) ........................ 10-2022-0046039

(51) Int. Cl.
*B01J 37/03*      (2006.01)
*B01J 21/06*      (2006.01)
*B01J 23/46*      (2006.01)

(52) U.S. Cl.
CPC ............. *B01J 37/033* (2013.01); *B01J 21/06* (2013.01); *B01J 23/464* (2013.01)

(58) Field of Classification Search
CPC ... B01J 21/06; B01J 23/42; B01J 23/44; B01J 23/464; B01J 23/8913; B01J 37/033; B01J 37/16; B22F 9/24; C25B 1/04; C25B 11/051; C25B 11/056; C25B 11/061; C25B 11/063; C25B 11/065; C25B 11/093; Y02E 60/36
See application file for complete search history.

(56) References Cited

U.S. PATENT DOCUMENTS

2006/0177728 A1 * 8/2006 Adzic ................... H01M 4/926
                                                                429/525
2012/0288430 A1 * 11/2012 Bello ...................... C01B 3/583
                                                                423/247

OTHER PUBLICATIONS

Salgado, J.R.C., et al., 2004, Journal of Power Sources, 138, 56-60. <doi: 10.1016/j.jpowsour.2004.06.011> (Year: 2004).*
Extended European Search Report on the European Patent Application No. 23161093.2 issued by the European Patent Office on Sep. 10, 2023.
Dong Ruohao et al., Selective Reduction-Oxidation Strategy to the Conductivity-Enhancing Ag-Decorated Co-Based 2D Hydroxides as Efficient Electrocatalyst in Oxygen Evolution Reaction, ACS Sustainable Chemistry & Engineering, vol. 6, Aug. 29, 2018, pp. 13420-13426.

(Continued)

*Primary Examiner* — Brian A McCaig
(74) *Attorney, Agent, or Firm* — IP&T GROUP LLP

(57) ABSTRACT

Disclosed are an electrochemical catalyst capable of lowering the overpotential of the oxygen evolution reaction (OER) during a water splitting reaction even with a very small amount of noble metal in the complicated water splitting reaction that requires high overpotential, and a water splitting system using the same.

20 Claims, 8 Drawing Sheets

(56) References Cited

OTHER PUBLICATIONS

Xing Yulin et al., Inductive effect between atomically dispersed iridium and transition-metal hydroxide nanosheets enables highly efficient oxygen evolution reaction, Chemical Engineering Journal, vol. 395, Sep. 1, 2020, p. 125149.

Youkui Zhang et al, Atomic Iridium Incorporated in Cobalt Hydroxide for Efficient Oxygen Evolution Catalysis in Neutral Electrolyte, Advanced Materials, May 3, 2018, p. 1-8, 30, 1707522.

Office Action for Korean Patent Application No. 10-2022-0046039 issued by the Korean Patent Office on Nov. 26, 2025.

* cited by examiner

NOBLE METAL NANOCLUSTER CATALYSTS FOR OXYGEN EVOLUTION REACTION AND WATER SPLITTING SYSTEM USING THE SAME

CROSS-REFERENCE TO RELATED APPLICATION

This application claims priority under 35 U.S.C. § 119 to Korean Patent Application No. 10-2022-0046039 filed on Apr. 14, 2022, which is incorporated herein by reference in its entirety.

BACKGROUND OF THE INVENTION

Field of the Invention

The present disclosure relates to noble metal nanocluster catalysts for oxygen evolution. More particularly, the present disclosure is directed to an electrochemical catalyst capable of lowering the overpotential of the oxygen evolution reaction (OER) during a water splitting reaction even with a very small amount of noble metal in the complicated water splitting reaction that requires high overpotential, and a water splitting system using the same.

Description of the Related Art

Water splitting (also known as "water electrolysis"), i.e., the splitting or dissociation of water into oxygen gas and hydrogen gas, is important to the energy storage as well as the production of oxygen gas and/or hydrogen gas. In particular, as interest in alternative energy has recently increased due to environmental pollution and depletion of fossil fuels, hydrogen energy through water splitting is attracting a great deal of attention as an alternative energy that is rich in raw materials, has no problems with environmental pollution and is efficient.

Water splitting refers to a process in which a compound that is not naturally dissociated into an anion and a cation in an aqueous solution is dissociated into an anion and a cation by application of an electric current. In this regard, a device for water splitting basically includes an external power source, an anode, and a cathode. The external power source provides the electricity required for water splitting, while each of the cathode and the anode serves to transfer electricity to the compound and to provide the sites to which the anion or cation is adhered. Since hydrogen evolution reaction and oxygen evolution reaction in water splitting act as rate-determining steps due to the low reaction rate, an electrochemical catalyst is required to increase the oxygen evolution rate or the oxygen reduction rate.

Specifically, energy is consumed for splitting water into hydrogen gas and oxygen gas, while energy is released when hydrogen gas binds again to oxygen gas to form water molecules. Therefore, the overall reaction mechanism of the water splitting process is depicted by the following Reaction Scheme 1.

Anode (oxidation): $H_2O \rightarrow 2H^+ + 2e^- + \frac{1}{2}O_2$

Cathode (reduction): $2H^+ + 2e^- \rightarrow H_2$

Overall reaction: $H_2O \rightarrow H_2 + \frac{1}{2}O_2$      [Reaction Scheme 1]

In particular, the half-cell reaction and overall reaction in an acidic medium and an alkaline medium, respectively, may be depicted by the following Reaction Schemes 2 and 3.

Anode (oxidation): $2H_2O \text{ (l)} \rightarrow O_2 \text{ (g)} + 4H^+ + 4e^-$ Cathode (reduction): $4H^+ + 4e^- \rightarrow 2H_2$ Overall reaction: $H_2O \text{ (l)} \rightarrow H_2 \text{ (g)} + \frac{1}{2}O_2 \text{ (g)}$      [Reaction Scheme 2]

Anode (oxidation): $4OH^- \rightarrow O_2 \text{ (g)} + 2H_2O + 4e^-$

Cathode (reduction): $4H_2O + 4e^- \rightarrow 2H_2 \text{ (g)} + 4OH^-$

Overall reaction: $H_2O \text{ (l)} \rightarrow H_2 \text{ (g)} + \frac{1}{2}O_2 \text{ (g)}$      [Reaction Scheme 3]

Oxygen and hydrogen gases are produced in a molar ratio of 1:2 through the water splitting reaction described above and the produced gas can be used as a non-polluting energy source or fuel.

In order for water splitting to be commercially competitive, catalysts are required to satisfy the following requirements: (i) high hydrogen or oxygen conversion efficiency, (ii) excellent durability, (iii) low driving voltage, and (iv) price competitiveness. In particular, it is preferable that electrochemically driven water splitting catalysts produce hydrogen or oxygen at low voltages, regardless of pH.

On the other hand, water splitting has a drawback of low reaction rate and thus research is ongoing on the applicability of various types of electrochemical catalysts. Noble metal-based catalysts for water splitting are widely known. In particular, platinum-based catalysts are typically used in the hydrogen evolution reaction, while iridium oxide ($IrO_3$) or ruthenium oxide ($RuO_3$) catalysts are widely used in the oxygen evolution reaction.

In addition, an example of electrochemical electrodes for water splitting that uses, as a substrate for the anode or cathode for water splitting, a structure having a plate, foil, or foam made of a metal (e.g., copper or nickel) and is decorated with a non-metal catalyst component such as manganese dioxide, tungsten, or iron chalcogenide has also been reported. However, such electrochemical electrodes are unsuitable for commercialization due to the high catalyst production cost compared to performance. Moreover, when inexpensive non-noble metal-based catalysts are used instead of the noble metal-based catalysts, corrosion may occur under an acidic environment or a high driving voltage is required. Therefore, there is still a need for improvement in performance compared to the noble metal-based catalysts.

Conventional electrochemical electrodes for water splitting exhibited catalytic activity above a certain level in the hydrogen evolution reaction (HER), but are limited to achieving good oxygen evolution reaction activity when acting as oxygen evolution electrodes (anodes). Specifically, the oxygen evolution reaction in the two half-cell reactions in the water splitting system is recognized as a technical barrier due to low reaction rate and the necessity of high overpotential. In particular, iridium oxide, which is mainly used as a catalyst for oxygen evolution reaction at the anode (oxidation electrode), has recently been pointed out as a factor that makes commercialization more difficult due to the high price thereof compared to other noble metals (e.g., platinum or ruthenium).

Therefore, there is a need for a method capable of overcoming the technical limitations of the prior art and providing excellent water splitting activity, particularly, oxygen evolution reaction activity, although a relatively inexpensive noble metal is used in a smaller amount.

SUMMARY OF THE INVENTION

An embodiment according to the present disclosure provides a catalyst capable of improving price competitiveness while exhibiting performance better than or comparable to conventional iridium oxide-based catalysts, which have been mainly used for an oxygen evolution reaction electrode, and a noble metal-based electrochemical electrode using the same.

Another embodiment according to the present disclosure provides a water splitting system in which a catalyst capable of achieving excellent oxygen evolution reaction despite applying a smaller amount of noble metal to an anode compared to the prior art.

According to a first aspect of the present disclosure, a catalyst for an oxygen evolution reaction electrode for water splitting comprises:

a nanostructure containing cobalt hydroxide; and noble metal nanoclusters dispersed in an amount of 0.5 to 2% by weight, based upon the weight of the catalyst, in the nanostructure.

According to a second aspect of the present disclosure, a preparation method of a catalyst for an oxygen evolution reaction electrode for water splitting comprises:

a) adding a cobalt precursor and a noble metal precursor to an aqueous medium to prepare a precursor solution, b) converting the cobalt precursor in the precursor solution into a nanostructure containing cobalt hydroxide by use of a reducing agent to form a product in which noble metal nanoclusters are dispersed in the nanostructure; and c) recovering the product, wherein the noble metal nanoclusters are present in an amount of 0.5 to 2% by weight, based upon the weight of the catalyst.

According to an embodiment the present disclosure, an oxygen evolution reaction electrode for water splitting comprises:

an electrode substrate; and a noble metal nanocluster catalyst loaded on the electrode substrate, wherein the catalyst comprises:

a nanostructure containing cobalt hydroxide, and noble metal nanoclusters dispersed in an amount of 0.5 to 2% by weight, based upon the weight of the catalyst, in the nanostructure.

In an embodiment, the electrode may exhibit an overpotential of 0.4 V (vs. RHE) or less at a reference current density of 10 mA/cm², and a scanning rate of 5 mV/s in the presence of 1 M KOH (pH 14).

In an embodiment, an amount of the noble metal nanocluster catalyst loaded on the electrode may range from 0.02 to 0.1 mg/cm².

According to a fourth aspect of the present disclosure, a water splitting system comprises:

an anode and a cathode as electrochemical electrodes electrically connected to an external power source, and an aqueous medium containing an electrolyte, wherein, upon application of a voltage from the external power source, oxygen is generated at the anode and hydrogen is generated at the cathode, the anode comprises a noble metal nanocluster catalyst loaded on an electrode substrate, and the noble metal nanocluster catalyst comprises (i) a nanostructure containing cobalt hydroxide, and (ii) noble metal nanoclusters dispersed in an amount of 0.5 to 2% by weight, based upon the weight of the catalyst, in the nanostructure.

BRIEF DESCRIPTION OF THE DRAWINGS

The above and other objects, features, and other advantages of the present disclosure will be more clearly understood from the following detailed description taken in conjunction with the accompanying drawings, in which.

DETAILED DESCRIPTION OF THE INVENTION

Figure 1:
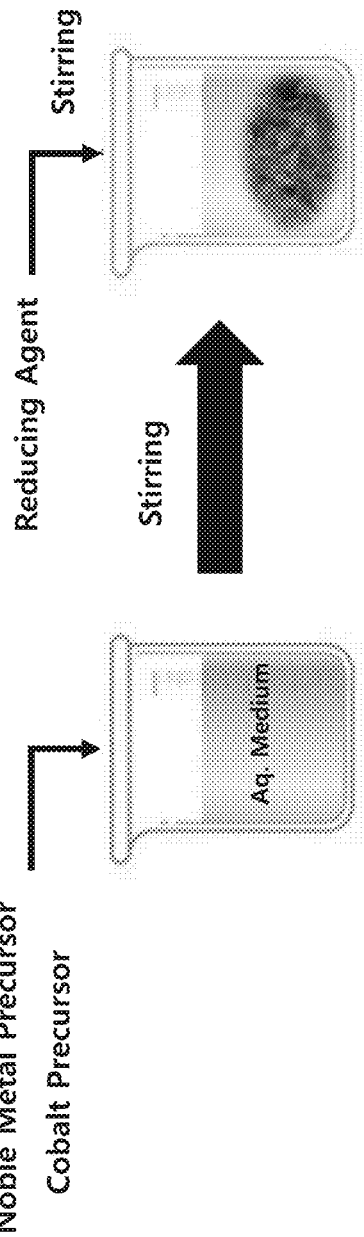
FIG. 1 is a schematic diagram illustrating a series of operations for preparing a noble metal nanocluster catalyst according to an embodiment.

The following description should be understood as describing embodiments of the present disclosure and should not be construed as limiting the scope of the present invention. In addition, the accompanying drawings are provided for better understanding of the present disclosure and should not be construed as limiting the scope of the present invention. Details of individual configurations may be appropriately understood from the specific intention of the related description given later.

As used herein, the term "catalyst" refers to a component that increases the rate of an electrochemical decomposition reaction and participates in the electrochemical reaction while not being consumed by the reaction. In a narrow sense, the catalyst may refer to a component that facilitates a reaction mechanism that provides or accepts electrons in the hydrogen evolution reaction and/or oxygen evolution reaction by water splitting.

As used herein, the term "water splitting" may refer to a reaction in which water is dissociated or decomposed into oxygen gas and hydrogen gas using electric energy supplied from an external source.

As used herein, the term "electrode" refers to a cathode at which reduction occurs or an anode at which oxidation occurs, upon applying a voltage from an external power source, is electrically connected to an external power source in the water splitting system, and is typically a conductive structure physically isolated from the external power source.

As used herein, the term "catalyst electrode" refers to a current collector on which a catalyst is loaded, whereby catalyst is absorbed thereon or is electrically connected thereto in a discrete or separate manner. In the context of the disclosure, the catalyst electrode may be understood as associating with the current collector through a change in oxidation state and/or dynamic equilibrium with an aqueous medium when the catalyst is exposed to the aqueous medium (e.g., an aqueous electrolyte solution).

As used herein, the term "nanocluster" refers comprehensively to a nanoscale assembly or aggregate of at least two metal atoms.

As used herein, the term "nanoparticle" refers to a nanoscale particle of the assembled or aggregated nanocluster.

As used herein, the term "reducing agent" refers to a substance that causes reduction of an organic compound by decreasing the oxidation state thereof.

As used herein, the term "electrochemical electrode" refers to an electrode structure in which a catalyst component facilitating water splitting is mixed with or attached to a substrate for an electrode (cathode and/or anode).

As used herein, the term "overpotential" refers to an additional potential in excess of the thermodynamic requirement for reduction or oxidation to obtain the desired catalytic activity. Here, the overpotential may mean the difference between the voltage to be applied to the electrode in order to induce water splitting and the thermodynamic voltage required for the water splitting.

Throughout the description, the terms "on", "over", "under" and "below" are used to refer to the relative positioning between elements or members, and the expressions "disposed on . . . " and "disposed under . . . " are used to refer to the relative positioning between elements (or members) wherein the elements (or members) may contact or not contact one another.

When a numerical range is specified herein with a lower limit and/or an upper limit, it will be understood that any subcombination within the numerical range is also disclosed. For example, the expression "1 to 5" may include 1, 2, 3, 4, and 5, and any sub-combination therebetween.

Throughout the description, when any element or member is described as "connected" to another component or member, unless stated otherwise, one element or member may be directly disposed on another element or member, or one element or member may be indirectly disposed on another element or member, with a further element or member interposed therebetween.

In a similar way, when any element or member is described that the element or member "contact(s)" another component or member, unless stated otherwise, one element or member may directly contact another element or member, or one element or member may indirectly contact another element or member, with a further element or member interposed therebetween.

Unless stated otherwise, the term "comprise" will be understood to imply the inclusion of not only stated elements and/or operations, but also other unstated elements.

Catalyst for Electrode and Method of Manufacturing the Same

One embodiment of the present disclosure provides a catalyst in which noble metals are dispersed or decorated as nanoclusters in cobalt hydroxide ($Co(OH)_2$) nanostructures, wherein the noble metal nanocluster catalyst may be applied to an electrochemical electrode, more particularly, an electrode (anode) for oxygen evolution reaction, in the water splitting system.

A series of operations for preparing a noble metal nanocluster catalyst according to an embodiment is shown in FIG. 1. According to the illustrated embodiment, the catalyst may be prepared in a single operation using chemical reduction.

Referring to FIG. 1, first, each of a cobalt precursor (cobalt source) and a noble metal precursor (noble metal source) is provided. In this regard, the cobalt precursor may include a water-soluble salt. The cobalt precursor, for example, may be at least one of halides (specifically, chlorides), sulfates, nitrates, phosphates, carbonates, acetates, and the like, and may also be a hydrate of such a compound. For example, water-soluble nitrate (or a hydrate thereof) may be used as the cobalt precursor, because nitrate is highly soluble in water.

Meanwhile, the noble metal precursor may be at least one noble metal selected from group VIII metals on the periodic table. However, as described above, the noble metal precursor may include at least one noble metal precursor selected from the group consisting of rhodium, platinum, and palladium to provide oxygen evolution reaction activity comparable to expensive iridium while replacing expensive iridium. For example, the noble metal precursor may include a rhodium precursor.

In an embodiment, the noble metal precursor may be in a form of halide, organic acid salt, inorganic acid salt, hydroxide, complex, combination thereof, or the like, or may be a hydrate of such a compound. For example, the rhodium precursor may include at least one selected from rhodium chloride, rhodium nitrate, chlororhodiumic acid (rhodium hydrochloride), rhodium acetylacetonate, rhodium acetate and the like. In addition, the platinum precursor may include at least one selected from platinum chloride, platinum acetylacetonate, chloroplatinic acid, ammonium chloroplatinate, dinitrodiaminoplatinum, tetrachlorodiaminoplatinum, hexachlorodiaminoplatinum, dichlorodiaminoplatinum, platinum dichloride (II), platinum tetrachloride (IV) and the like. In addition, the palladium precursor may include at least one selected from palladium acetate, palladium chloride, palladium nitrate, palladium sulfate, palladium acetylacetonate and the like.

According to the illustrated embodiment, the cobalt precursor and noble metal precursor are sequentially or simultaneously added to an aqueous medium (e.g., deionized water) to prepare a precursor solution. At this time, the concentration of the cobalt precursor in the precursor solution may be, for example, in a range of about 50 to 200 mM (in an embodiment, this range may be about 80 to 150 mM, in an embodiment this range may be about 90 to 100 mM). When the concentration of the cobalt precursor in the precursor solution is too high or too low, the nanostructure of the cobalt hydroxide may collapse. For this reason, it is preferable to properly adjust the concentration within the range exemplified above. In addition, the concentration of the noble metal precursor in the precursor solution may be, for example, within the range of about 1 to about 10 mM (in an embodiment, this range may be about 2 to about 6 mM; in an embodiment, this range may be about 3 to about 5 mM). When the concentration of the noble metal precursor in the solution is too high or too low, the metal may aggregate (agglomerate) or fail to be supported or loaded. Taking into consideration the above, the concentration may be properly adjusted within the range exemplified above. However, the concentration range described above may be provided for an illustrative purpose.

In this regard, the ratio between the noble metal precursor and the cobalt precursor in the precursor solution may be determined depending on the composition of the final catalyst. In an embodiment, the molar ratio between the noble metal precursor and the cobalt precursor may be about 0.01:1 to 0.06:1. In an embodiment, the molar ratio between the noble metal precursor and the cobalt precursor may be about 0.02:1 to 0.05:1. In an embodiment, the molar ratio between the noble metal precursor and the cobalt precursor may be about 0.03:1 to 0.04:1. However, the above ranges are mere examples, and the disclosure is not limited thereto. That is, the ratio may vary depending on an embodiment.

In an embodiment, the precursor solution may be stirred and the stirring speed may be adjusted in a range of, for example, about 100 to 3,000 rpm. In an embodiment, the stirring speed may be adjusted in a range of, for example, about 500 to 2,000 rpm. In an embodiment, the stirring speed may be adjusted in a range of, for example, about 1,200 to 1,800 rpm. The ranges, however, are mere examples and is not necessarily limited thereto. In addition, for homogeneous mixing between the precursors, stirring may optionally be performed by sonication, and the stirring time is, for example, controlled in a range of about 0.1 to 10 hours (in an embodiment, it may be 0.3 to 5 hours; in an embodiment, it may be about 0.4 to 1 hour). The stirring time may vary depending on the embodiment.

Then, a reducing agent is added to the precursor solution to perform single-step chemical reduction. In this process, the cobalt precursor in the precursor solution may be a hydroxide, for example, cobalt hydroxide, and the noble metal precursor may be at least partially reduced.

According to an embodiment, the reducing agent may be added by itself or may be added in the form of a solution of the reducing agent in an aqueous medium (e.g., deionized water). The concentration of the reducing agent solution may be adjusted in a range of, for example, about 50 to 500 mM. In an embodiment, this range may be about 100 to 400 mM. In another embodiment, this range may be about 200 to 300 mM. In addition, the aqueous solution of reducing agent may be added dropwise to the precursor solution and the temperature of the reduction reaction using the reducing agent is, for example, about 10 to 50° C. In an embodiment, this range may be about 15 to 40° C. In an embodiment, this range may be about 20° C. to 30° C. In an embodiment temperature may be at approximately room temperature. In addition, the reduction reaction time may be adjusted in a range of about, for example, 1 to 10 hours. In an embodiment, this time may be about 2 to 6 hours. In an embodiment, this time may be about 3 to 5 hours.

According to an embodiment, the reducing agent may be selected from reducing agents having high solubility and reducing power and may, for example, be hydrazine, ascorbic acid, sodium hydroxide, potassium hydroxide, tannic acid, dimethylformamide, tetrabutylammonium borohydride, lithium borohydride, sodium borohydride or the like, or in combination of two or more thereof. In an embodiment, sodium borohydride ($NaBH_4$) may be used as a reducing agent, because metal ions can be effectively reduced due to its very high reducing power thereof.

In addition, according to an embodiment, the amount of the reducing agent added to the precursor solution may be determined in consideration of the reducing power. For example, the molar ratio of the reducing agent to the total metal precursor is controlled in a range of about, for example, 0.1 to about 5. In an embodiment, this range may be about 0.5 to about 3. In an embodiment, this range may be about 1 to about 2.

As the reduction reaction proceeds as described above, cobalt and noble metals in the precursor solution are converted into solid phases and then may be subject to typical post-treatments including at least one (specifically, 3 to 8 times) washing operation (e.g., using water, specifically distilled water) and/or drying operation to obtain or recover the catalyst. In an embodiment, the drying temperature may be adjusted in a range of, for example, about 30 to 150° C. In an embodiment, this range may be about 40 to 100° C. In an embodiment, this range may be about 60 to 80° C. The above ranges are mere examples, and may vary depending on an embodiment.

Cobalt hydroxide forms a nanostructure by chemical reduction using the reducing agent described above. This nanostructure may be a multidimensional structure in which nanosheets are assembled or aggregated. In this case, the nanosheet in the nanostructure may have a sheet thickness of, for example, about 5 to 50 nm. In an embodiment, this range may be about 8 to 40 nm. In an embodiment, this range may be about 10 to 30 nm. In an embodiment, the nanosheet in the nanostructure may have a flower-like or flower-shaped morphological property. The multidimensional structure formed by assembling the nanosheets facilitates mass transfer of reactants/products and is capable of effectively exposing active sites. In particular, in water splitting, the multidimensional structure effectively exposes the active sites to hydroxide ions ($OH^-$) and has a structural function of enabling oxygen generated through OER to easily escape.

In specific embodiments, the cobalt hydroxide may be $\beta$-$Co(OH)_2$, which has crystallinity structurally distinguished from $\alpha$-$Co(OH)_2$, which contains anions that interact with other crystalline phases, such as cobalt tetrahedral sites which reduce electrochemical properties and is beneficial because it can improve electrochemical properties during the oxygen evolution reaction.

The catalyst according to a specific embodiment may have a configuration in which noble metal nanoclusters are homogeneously dispersed in the cobalt hydroxide nanostructure. In this case, as described above, the noble metal may be at least one noble metal selected from the group consisting of rhodium, platinum, and palladium, and may be specifically rhodium. In particular, a large number of fine noble metal sites binding to the cobalt atom exist in the cobalt hydroxide nanostructure, thus maximizing exposure of the active sites of the catalyst. At this time, the size (average size) of the noble metal nanoclusters may be measured using a measurement method known in the art, for example, a transmission electron microscope (specifically, HADDF-STEM), and is, for example, in a range of about 1 nm or less. In an embodiment, this range may be about 0.9 nm or less. In an embodiment, this range may be about 0.4 to 0.8 nm. In particular, characteristic peaks corresponding to the noble metals may not be observed by the XRD pattern, which means that the degree of dispersion or decoration of the noble metal in the cobalt hydroxide is remarkably high. Furthermore, the noble metal nanoclusters may be uniformly present not only outside of the cobalt hydroxide nanostructure, but also throughout a plurality of nanosheets constituting the nanostructure.

According to one embodiment, the content of the noble metal nanoclusters dispersed and decorated in cobalt hydroxide is, for example, in a range of about 0.5 to 2% by weight. In an embodiment, this range may be about 0.8 to 1.8% by weight. In an embodiment, this range may be about 1 to about 1.6% by weight. In an embodiment, this range may be about 1.2 to 1.5% by weight, based on the weight of the catalyst. In this regard, when the content of the noble metal in the catalyst is too high, nanoparticles may be formed due to agglomeration or aggregation of noble metal nanoclusters. As a result, the size of the noble metal nanoparticles exceeds 1 nm and may increase to about 2 nm depending on the noble metal content. In this case, the increase in the size of the noble metal decreases the active sites of the oxygen evolution reaction and thus reduces electrochemical activity. On the other hand, the excessively low noble metal content may cause insufficient active sites for electrochemical reactions. Therefore, the content of the noble metal nanoclusters is determined within the above range, but such range of the noble metal content may be changed according to the type of noble metal. Notably, the electrochemical catalyst according to the embodiment has active site distribution and content optimized for oxygen evolution reaction.

Meanwhile, compared to the conventional iridium oxide-based catalyst, the electrochemical catalyst prepared by the method according to the present disclosure can exhibit an equivalent or higher electrochemical activity, especially oxygen evolution reaction activity, which is advantageous in terms of economic feasibility and commercialization. In particular, it is noteworthy that the catalyst can be prepared in a simple manner, such as a single reduction step, and exhibits excellent catalytic activity even with a small amount of loading, compared to conventionally known iridium oxide-based catalysts.

Although the present disclosure is not bound to a particular theory, the reason for the fact that the above-described catalyst preparation method provides excellent oxygen evolution reaction activity despite using relatively inexpensive noble metals may be explained as follows.

In general, cobalt hydroxide (specifically, $\beta$-Co(OH)$_2$) has considerably poor oxygen evolution reaction activity by itself. However, by dispersing or decorating (supporting or loading) a noble metal such as rhodium in the form of nanoclusters on the cobalt hydroxide nanostructures, the electronic structure of the hybrid catalyst can be controlled due to the strong electronic interaction caused by the difference in electronegativity between the cobalt hydroxide and the noble metal nanoclusters. In particular, it is believed that, as the noble metal is highly dispersed and decorated in the form of extremely fine nanoclusters, the active surface area is maximized and ultimately the performance of the oxygen evolution reaction can be improved.

Electrode for Xxygen Evolution Reaction (Catalyst Electrode) and Water Splitting System According to another embodiment of the present disclosure, a catalyst in which noble metal nanoclusters are highly dispersed and decorated in cobalt hydroxide may be loaded on an electrochemical electrode, thereby forming a water splitting system using the same. In particular, the electrode on which the above-described catalyst is loaded may be applied as an anode where an oxygen evolution reaction occurs in a water splitting system.

According to an embodiment, the catalyst may be loaded on a conductive substrate in the fabrication of the electrode. Such a loading method is not particularly limited and may be selected from methods known in the art, for example, loading using a slurry, deposition, spray coating, or the like.

In an embodiment, using the slurry loading method, first, a slurry of the previously prepared catalyst (as a dispersion medium, for example, at least one selected from the group consisting of alcohol having 1 to 4 carbon atoms (e.g., methanol, ethanol, or propanol) and water (e.g., distilled water)) may be prepared. At this time, the concentration of the catalyst slurry may be adjusted in a range of, for example, about 5 to 30% by weight, specifically about 10 to 20% by weight. Subsequently, a catalyst electrode may be prepared by applying the slurry to an electrode substrate (e.g., a conductive substrate), followed by drying.

Alternatively, a deposition method may be used. In this case, the catalyst layer to be loaded may be controlled by adjusting the deposition rate, drying temperature, or the like, and washing may be performed after deposition.

According to embodiments, the substrate on which the catalyst is loaded may have any of various shapes such as a plate, a rod, a mesh, a disk, or a wire. In addition, the conductive substrate may be made of a material capable of maintaining conductivity even when exposed to an oxidizing atmosphere, for example, at least one selected from valve metal (specifically, titanium, aluminum, chromium, or the like), stainless steel, and carbon, the like.

In an embodiment, the amount of catalyst that is loaded is, for example, in a range of about 0.02 to 0.1 mg/cm$^2$. In an embodiment, the amount of catalyst that is loaded is, for example, in a range of about 0.03 to 0.09 mg/cm$^2$. In an embodiment, the amount of catalyst that is loaded is, for example, in a range of about 0.04 to 0.08 mg/cm$^2$, based on the electrode. In an embodiment, the amount of catalyst that is loaded is, for example, in a range of range from about 0.05 to 0.07 mg/cm$^2$. However, the above ranges are mere examples, and the disclosure is not limited thereto. That is, the amount loaded may vary depending on an embodiment.

According to one embodiment of the present disclosure, a water splitting system may be implemented. The water splitting system may use the electrochemical electrode as described above as an anode to generate hydrogen at the cathode and to generate oxygen at the anode. The water splitting system basically includes a pair of opposite electrodes (i.e., an anode and a cathode), and each of the pair of electrodes is electrically connected to an external power source (e.g., a potentiostat, a battery, or the like). In addition, a three-electrode system may further include a reference electrode. The reference electrode may be made of a material selected from the group consisting of Ag/AgCl, SCE (saturated calomel electrode), Hg/HgO, and Hg/Hg$_2$SO$_4$, and specifically, Ag/AgCl (3M NaCl).

According to an exemplary embodiment, in the water splitting system, among a pair of electrodes, an electrochemical electrode containing the aforementioned catalyst or being attached thereto is used as an anode, and the other electrode, the cathode, may be made of a type of material known in the art. In this regard, the cathode may also be made of a conductive material. For example, the conductive material applicable to the cathode may be selected from materials capable of exhibiting particularly low overpotential while easily generating hydrogen and not being decomposed even when contacting an aqueous electrolyte solution and for example, this material may include at least one selected from platinum, nickel, cobalt, iron, and the like (including alloys). In the water splitting system according to a specific embodiment, each of the cathode and the anode may be operated in a manner of being in contact with or immersed in an electrolyte-containing aqueous solution. For example, each of such the pair of electrodes may be operated in a manner that at least about 20% of the surface of the pair of electrodes is immersed in an electrolyte-containing aqueous solution (in an embodiment, at least about 50%; in an embodiment, at least 80%). In an embodiment, substantially the entire surface of the pair of electrodes may be immersed in an electrolyte-containing aqueous solution.

Meanwhile, according to an embodiment, an aqueous medium (water) may be supplied to the water splitting system, but in an embodiment, an aqueous electrolyte solution (which may be acidic or alkaline) in which the electrolyte is dissolved in the aqueous medium may be supplied thereto. In this case, the alkaline medium (or electrolyte) may include at least one selected from potassium hydroxide, potassium hydrogen carbonate, potassium bicarbonate, sodium hydrogen carbonate, sodium hydroxide, lithium hydroxide, and the like. For example, the concentration of the alkaline medium may be, for example, in a range from about 0.05 to 3 M. In an embodiment, this range may be from about 0.1 to 2 M. In an embodiment, this range may be from about 0.5 to 1.5 M. In addition, the pH of the alkaline medium (specifically, the electrolyte-containing aqueous solution) may be adjusted within the basic range, for example, within the range of about 9 to 14 (in an embodiment, may be about 11 to 14; in an embodiment, may be about 12 to 14).

Meanwhile, according to an embodiment, the acidic medium (or electrolyte) may include at least one selected from sulfuric acid, nitric acid, phosphoric acid, perchloric acid, hydrochloric acid, and the like. For example, the concentration of the acidic medium may be adjusted in a range of, for example, about 1 to 5 M. In an embodiment, this range may be about 1 to 4 M. In an embodiment, this range may be about 1 to 2 M. In addition, the pH of the acidic medium may be adjusted, for example, within the range of about 4 or less (in an embodiment, about 1 to 3; in an embodiment, about 1 to 2).

According to an embodiment, the water splitting system may perform a hydrogen and/or oxygen evolution reaction using a water electrolyzer based on an alkaline or acidic electrolyte-containing aqueous solution.

Alternatively, a water splitting system may be configured using a polymer electrolyte membrane or the like as a separator. This separator is typically disposed between the cathode and the anode and functions to form a barrier to prevent re-formation of water due to mixing oxygen generated at the anode with hydrogen generated at the cathode. In this regard, separator materials include porous ceramic membranes (e.g., zirconia-based membranes), porous polymeric membranes (e.g., polyolefin-based, more specifically polypropylene-based membranes), solid polymer electrolyte membranes (such as an ion exchange membrane made of a fluorosulfonic acid polymer under the trade name Nafion), and the like.

In general, the thermodynamic decomposition voltage for the water splitting is 1.23 V at 25° C. and atmospheric pressure. However, the reaction rate is reduced and water splitting hardly occurs due to various resistance factors in the actual water splitting system. Therefore, typically, the water splitting does not occur until an overpotential is applied. That is, when the absolute values of the oxidation current generated at the anode and the reduction current at the cathode are identical to each other, that is, when the amounts of electrons flowing from the anode and the cathode are identical, a circuit can be formed and thus water splitting is possible. The potential for current of the identical intensity to flow in the pair of opposite electrodes is different at respective electrodes and the voltage at this time corresponds to the overpotential at each electrode.

The water splitting system including the electrochemical electrode using the composite catalyst according to the present embodiment enables performing the water splitting reaction at a low overpotential. For example, when oxygen (or oxygen gas) is generated from an anode by water splitting, the operation is possible at a low overpotential. In addition, water splitting may be performed at, for example, about 15 to 40° C. In an embodiment, this range may be about 20 to 30° C. In an embodiment, the temperature may be at approximately room temperature.

According to the present embodiment, when an electrochemical electrode, on which a catalyst with noble metals decorated in cobalt hydroxide with a high degree of dispersion, is used as an anode, the OER performance may be, for example, about 0.4 V or less. In an embodiment, this range may be about 0.3 V or less. In an embodiment, this range may be about 0.25 V or less. In an embodiment, this range may be about 0.22 V or less at a reference current density of 10 mA/cm$^2$, a scan rate of 5 mV s$^{-1}$ in the presence of 1 M KOH (pH 14). The Tafel slope may be, for example, about 100 mV/dec or less. In an embodiment, this range may be about 90 mV/dec or less. In an embodiment, this range may be about 80 mV/dec or less.

Meanwhile, when the electrochemical electrode according to the present embodiment is applied to water splitting, oxygen and hydrogen may be recovered from the anode and the cathode, respectively. In particular, the purity of the oxygen generated at the anode is, for example, at least about 98% (in an embodiment, at least about 99%; in an embodiment, at least about 99.9%), substantially 100%. In addition, the purity of the hydrogen generated at the cathode may be, for example, at least about 98% (in an embodiment, at least about 99%; in an embodiment, at least about 99.9%).

Hereinafter, embodiments will be provided for better understanding of the present disclosure. However, the following examples are provided only for illustration of the present disclosure and thus should not be construed as limiting the scope of the present disclosure.

EXAMPLE

The details of the materials used in Examples, catalyst analysis and electrochemical performance test are as follows.

A. Materials

Cobalt (II) nitrate hexahydrate (Co(NO$_3$)$_2$·6H$_2$O, 98.5%), rhodium (III) chloride (RhCl$_3$·xH$_2$O, 99.9%), sodium borohydride (NaBH$_4$, >99%)) and potassium hydroxide (KOH, 1.0 M) were each purchased from the Sigma-Aldrich.

All of the purchased materials were used without any additional purification process. In addition, deionized water was used as the water used in the example.

B. Catalytic Analysis

The crystal plane of metal was observed using X-ray diffraction (XRD; PANalytical). At this time, measurement was performed at 40 kV and 100 mA using a Cu Kα line in the range of 10 to 80° at a scan rate of 6°/min at an interval of 0.01°.

The change of oxidation number of the transition metal was analyzed using an X-ray photoelectron spectroscopy (XPS; ESCALAB 250Xi). All XPS results were calibrated based on 284.6 eV, the is binding energy of carbon.

Whether or not nanoclusters were present was determined using a transmission electron microscope (high-angle annular dark-field scanning transmission electron microscope; HADDF-STEM; JEM-2100F) and a Lacey carbon type A substrate was loaded with the sample for analysis.

C. Test for Evaluation of Electrochemical Performance (OER)

The catalyst was deposited on a glassy carbon electrode, which is a rotating disk electrode (RDE), using a micropipette at 80° C. to prepare a working electrode (loading amount: 0.04 mg/cm²).

The polarization of OER was measured under conditions of a 1M KOH solution (pH 14) and a scan rate of 5 mV/s at room temperature. Meanwhile, Hg/HgO (sat. 1M NaOH) and Pt wire were used as a reference electrode and a counter electrode, respectively.

In addition, the potential measured during the electrochemical test was converted from Hg/HgO to a reversible hydrogen electrode (RHE) in accordance with Equation 1 below and all measured values were expressed as "vs RHE (reversible hydrogen electrode)".

$$E(RHE)=E(Hg/HgO)+0.8676 \qquad \text{[Equation 1]}$$

In addition, linear sweep voltammetry (LSV) was measured to determine water splitting efficiency and the Tafel slope was calculated based thereon.

Example 1

Preparation of Rhodium Nanocluster-Cobalt Hydroxide (RhNC—Co) Catalyst 4 mmol of cobalt(II) nitrate hexahydrate and 0.15 mmol of rhodium chloride hydrate were added to 45 mL of distilled water, and the mixture was stirred for 1 hour under sonication until each precursor was completely dissolved. Then, 5 mL of an aqueous solution containing 1.3 mmol of NaBH₄ was added thereto dropwise at room temperature, and then the resulting solid was slowly washed 5 times with an excess of distilled water over 3 hours and was subsequently dried in an oven maintained at 70° C. for one day to obtain a rhodium nanocluster-cobalt hydroxide (RhNC—Co) catalyst.

Comparative Example 1

Preparation of Rhodium Nanoparticle-Cobalt Hydroxide (RhNP—Co) Catalyst

A rhodium nanoparticle-cobalt hydroxide (RhNP—Co) catalyst was prepared in the same manner as in Example 1, except that the amount of rhodium (III) chloride that was added was increased (1.7 times compared to Example).

Comparative Example 2

Preparation of Pure Cobalt Hydroxide (P—Co) Catalyst

A pure cobalt hydroxide (P—Co) catalyst was prepared in the same manner as in Example 1, except that rhodium (III) chloride was not added.

Comparative Example 3

Commercially available IrO₂ black (weight 100%, Alfa Aesar) was used as an anode catalyst.

Results and Discussion

A. Characterization

SEM Analysis

Figure 2A:
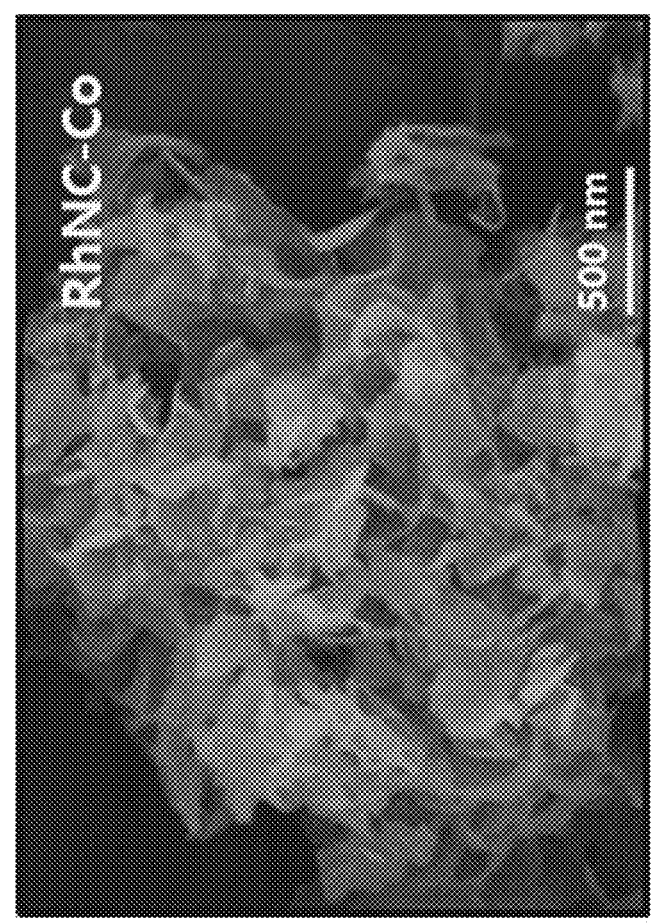
FIGS. 2A and 2B are images showing the results of a scanning electron microscope (SEM) analysis and high-angle annular dark-field scanning transmission electron microscopy (HAADF-STEM) analysis of a rhodium nanocluster catalyst (RhNC—Co), respectively.

The results of SEM analysis of the rhodium nanocluster catalyst (RhNC—Co) are shown in FIG. 2A. As can be seen from FIG. 2A, the RhNC—Co catalyst has a configuration in which the Co(OH)₂ nanosheets are assembled to result in a multidimensional nanostructure. In particular, the nanosheets had a thickness of about 10 nm and a flower-shaped structure and each nanosheet wrinkled.

HAADF-STEM Analysis

Figure 2B:
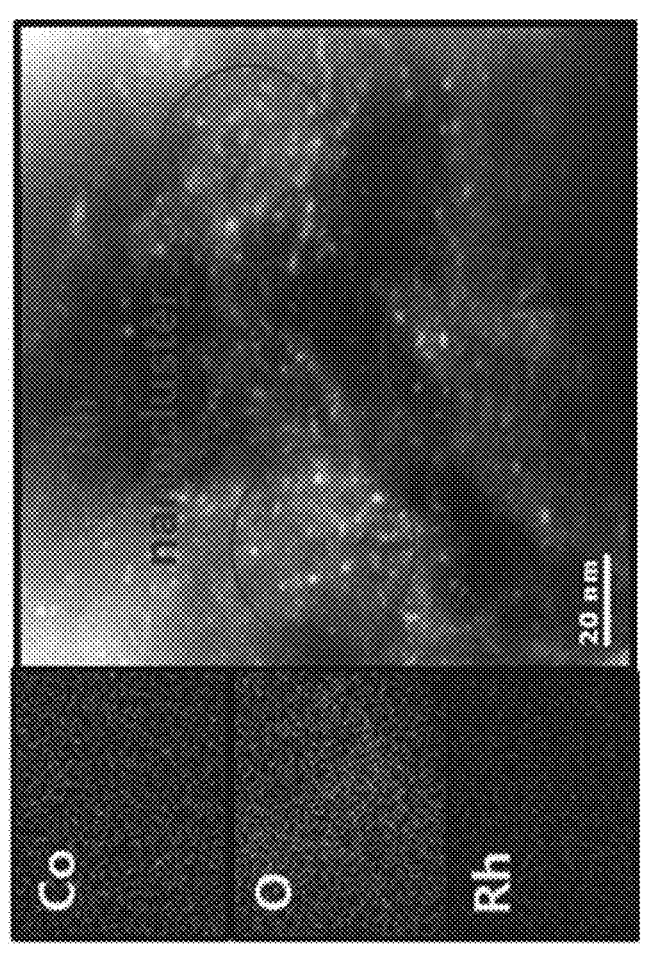

The result of HAADF-STEM analysis of the rhodium nanocluster catalyst (RhNC—Co) is shown in FIG. 2B. Referring to FIG. 2B, the rhodium nanoclusters are homogeneously dispersed throughout the cobalt hydroxide (Co (OH)₂) nanostructures. At this time, the average size of the rhodium nanoclusters was about 0.8 nm. In addition, the result of HAADF-STEM analysis showed that none of nanoparticle and bulky rhodium metal was observed, and nanoclusters were homogenously loaded throughout the cobalt hydroxide nanostructure.

Figure 3:
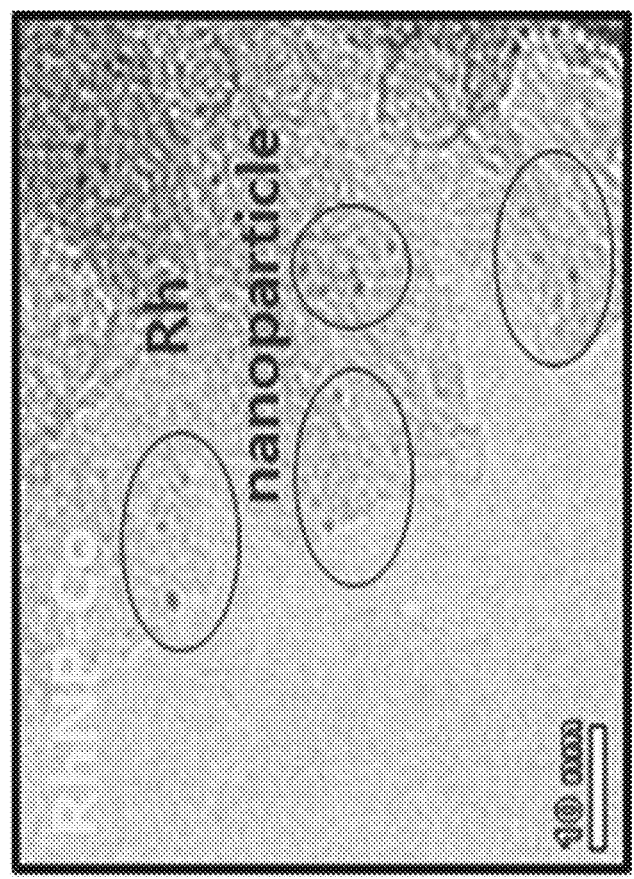
FIG. 3 is an image showing the result of HAADF-STEM analysis of the rhodium nanoparticle catalyst (RhNP—Co)

The results of HAADF-STEM analysis of the rhodium nanoparticle catalyst (RhNP—Co) prepared according to Comparative Example 1 are shown in FIG. 3. As can be seen from FIG. 3, rhodium was homogenously dispersed in cobalt hydroxide, but nanoparticles were present as aggregated nanoclusters. At this time, the rhodium nanoparticles had an average size of approximately 2 nm and were intermittently formed at irregular intervals rather than being homogeneously dispersed throughout the cobalt hydroxide nanostructure.

XRD Analysis

The XRD patterns of the pure β-Co(OH)₂ nanostructure (P—Co) according to Comparative Example 2, rhodium nanocluster catalyst according to Example 1 (Rh nanocluster/β-Co(OH) nanostructure; RhNC—Co), and rhodium nanoparticle catalyst according to Comparative Example 1 (Rh nanoparticle/β-Co(OH)₂ nanostructure; RhNP—Co), respectively, were analyzed and the results are shown in FIG. 4.

Figure 4:
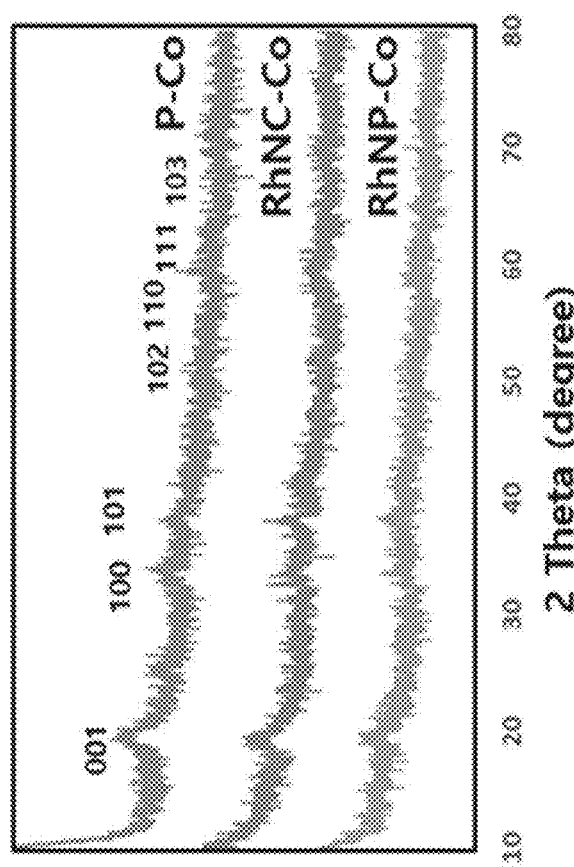
FIG. 4 shows X-ray diffraction (XRD) patterns of a pure $\beta$-Co(OH)$_2$ nanostructure (P—Co), a rhodium nanocluster catalyst (Rh nanocluster/$\beta$-Co(OH)$_2$ nanostructure; RhNC—Co), and a rhodium nanoparticle catalyst (Rh nanoparticle/$\beta$-Co(OH)$_2$ nanostructure; RhNP—Co)

As can be seen from FIG. 4, β-Co(OH)₂ was successfully synthesized and the RhNC—Co and RhNP—Co catalysts exhibited XRD patterns similar to those of the P—Co catalyst. As such, it can be seen that, taking into consideration the fact that the characteristic peak of rhodium was not observed, rhodium with a very fine size was highly dispersed in the catalyst. These results can also be confirmed from the results of HAADF-STEM analysis shown in FIGS. 2B and 3.

XPS Analysis

The results of XPS analysis of the rhodium nanocluster catalyst (RhNC—Co) are shown in Table 1 below and FIG. 5.

TABLE 1

| Item | P—Co | RhNC—Co | RhNP—Co |
|------|------|---------|---------|
| Rh(at %) | — | 0.4 | 0.6 |
| Rh(wt %) | — | 1.4 | 2.1 |

Figure 5:
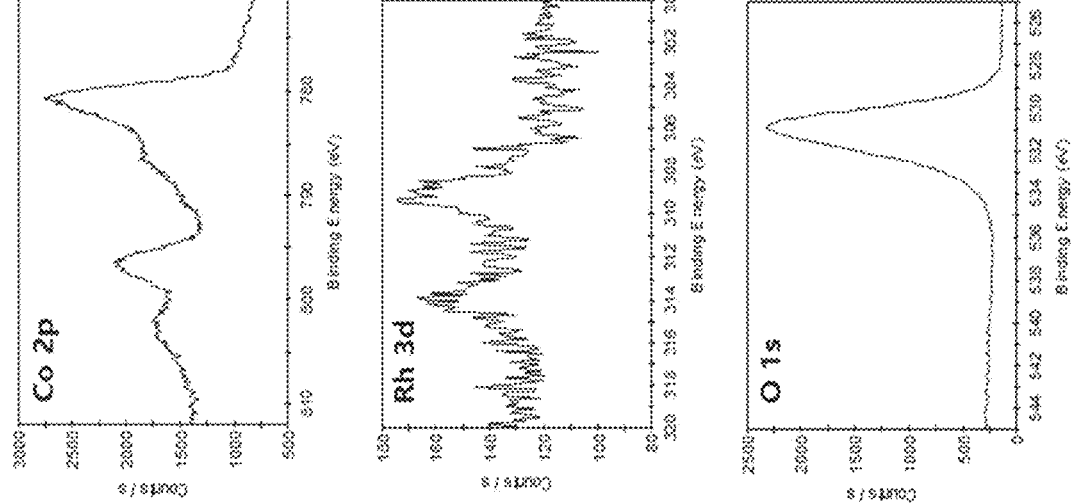
FIG. 5 shows the result of X-ray photoelectron spectroscopy (XPS) of the rhodium nanocluster catalyst (RhNC—Co)

With reference to Table 1 as above and FIG. 5, the result of XPS analysis showed that Co, Rh, and O elements were present in the RhNC—Co catalyst and in particular, a very small amount (1.4 wt % corresponding to 0.4 at %) of rhodium was loaded therein. However, when the content of rhodium was increased by 2 wt % or more as in Comparative Example 1, rhodium nanoparticles having a size of about 2 nm were formed. Therefore, it can be seen that as the rhodium content increased, the agglomeration of nanoclusters was induced and thus the size of nanoparticles became larger.

In addition, Co 2p spectrum peak binding energy and satellite peaks indicated that Co ions having a valence state of +2 were dominantly present. In addition, it can be seen that the Rh 3d spectrum was present in a partially reduced state compared to a metallic form.

B. Electrochemical Performance Analysis

Figure 6:
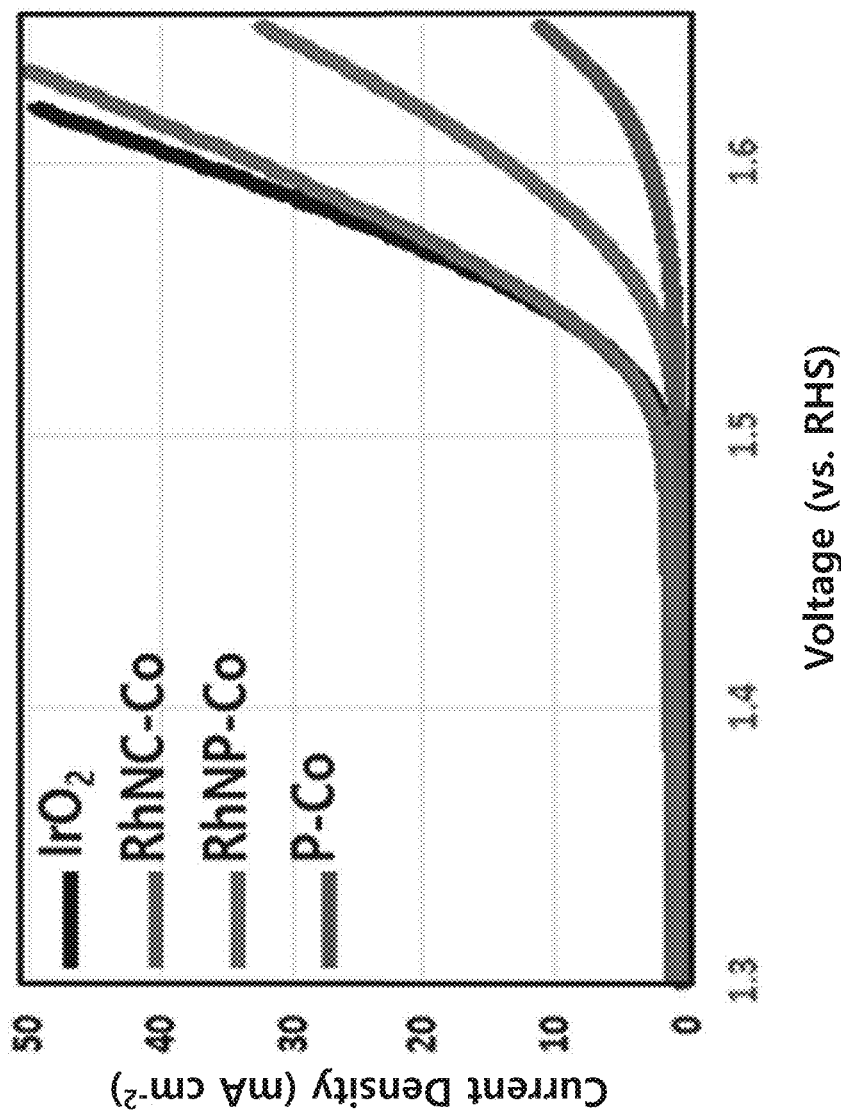
FIG. 6 is a current density vs voltage curve of each of a conventional iridium oxide (IrO$_2$) catalyst, a pure $\beta$-Co(OH)$_2$ nanostructure (P—Co), a rhodium nanocluster catalyst (RhNC—Co), and a rhodium nanoparticle catalyst (RhNP—Co)

Current density vs. voltage curves of commercial iridium oxide ($IrO_2$) catalyst, pure $\beta$-$Co(OH)_2$ nanostructure (P—Co), rhodium nanocluster catalyst (RhNC—Co), and rhodium nanoparticle catalyst (RhNP—Co), respectively, are shown in FIG. 6.

As can be seen from FIG. 6, the hybrid catalyst (RhNC—Co, Example 1) in which a small amount of rhodium nanoclusters is dispersed or decorated in $\beta$-$Co(OH)_2$ had a potential of 0.22 V vs. RHE at 10 mA/cm$^2$, whereas each of the hybrid catalyst (RhNP—Co, Comparative Example 1) with rhodium decorated in the form of nanoparticles and pure $\beta$-$Co(OH)_2$ (P—Co, Comparative Example 2) had a potential of 0.26 V vs. RHE at 10 mA/cm$^2$ and 0.32 V vs RHE, respectively, which means that the catalyst according to Example 1 exhibited a lower overpotential than the catalysts according to Comparative Examples 1 and 2. This indicates that the catalyst according to Example 1 exhibited remarkably high performance in terms of oxygen evolution reaction activity.

On the other hand, $IrO_2$ (Comparative Example 3), a commercial catalyst, had a potential of 0.21 V vs RHE, and the catalyst according to Example 1 exhibited an oxygen evolution reaction activity comparable thereto. As such, the OER performance was in the order of $IrO_2$=RhNC—Co>RhNP—Co>P—Co.

Figure 7:
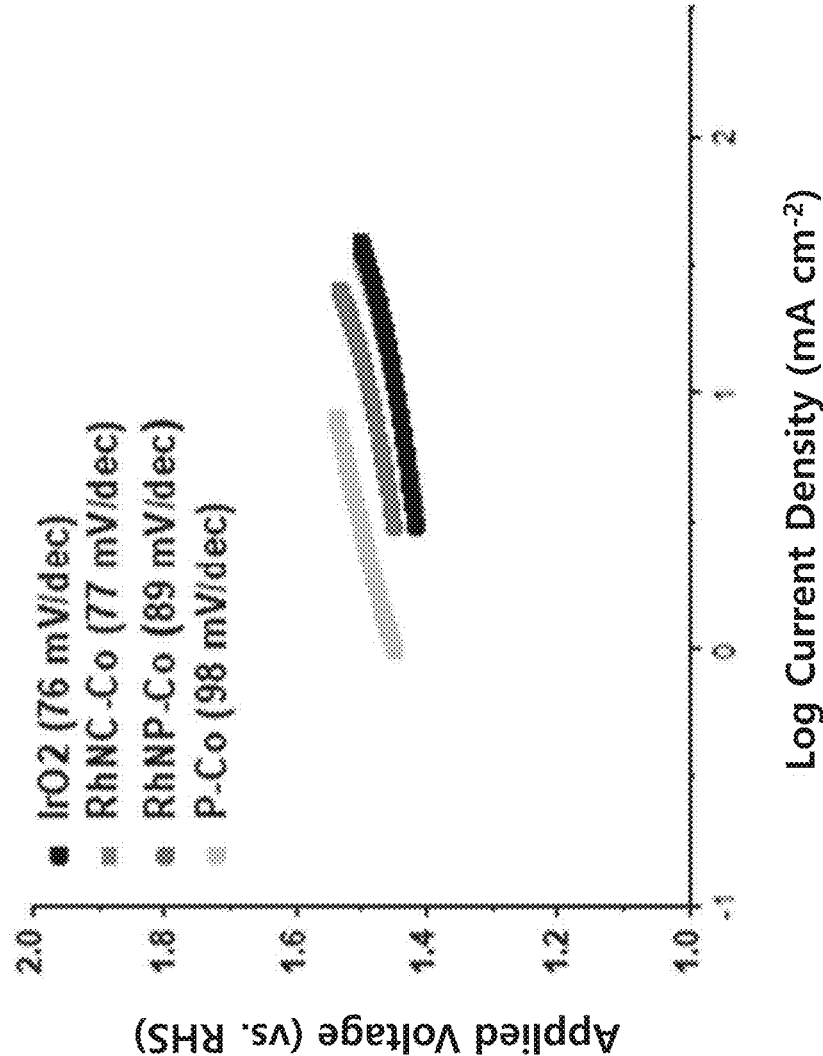
FIG. 7 is an applied voltage vs log current density curve of each of the commercial iridium oxide (IrO$_2$) catalyst, the pure $\beta$-Co(OH)$_2$ nanostructure (P—Co), the rhodium nanocluster catalyst (RhNC—Co), and the rhodium nanoparticle catalyst (RhNP—Co).

The curve of applied voltage vs log current density for each of commercial iridium oxide ($IrO_2$) catalyst, pure $\beta$-$Co(OH)_2$ nanostructure (P—Co), rhodium nanocluster catalyst (RhNC—Co), and rhodium nanoparticle catalyst (RhNP—Co) is shown in FIG. 7. Referring to FIG. 7, the OER kinetics can be determined through the slope of the Tafel plot. The slope of RhNC—Co was similar to that of $IrO_2$ and had a lower value than that of RhNP—Co and P—Co. This indicates that RhNC—Co promoted the oxygen evolution reaction through a more efficient catalytic reaction pathway.

On the other hand, Example 1, Comparative Examples 1 to 3, and recently reported Co—Ir catalyst (Adv. Mater. 2018, 30, 1707522) are compared with OER catalysts in a basic medium (1 M KOH) and the results are summarized in Table 2 below.

TABLE 2

| Catalyst | Overpotential (V vs RHE) (reference current density: 10 mA/cm$^2$) |
|----------|-------------------------------------------------------------------|
| $IrO_2$ (Comparative Example 3) | 0.21 |
| RhNC—Co (Example 1) | 0.22 |
| RhNP—Co (Comparative Example 1) | 0.26 |
| P—Co (Comparative Example 2) | 0.32 |
| CoIr-0.2 (Adv. Mater. 2018, 30, 1707522) | 0.235 |
| CoIr-0.1 (Adv. Mater. 2018, 30, 1707522) | 0.247 |
| CoIr-0.05 (Adv. Mater. 2018, 30, 1707522) | 0.267 |
| CoIr-0 (Adv. Mater. 2018, 30, 1707522) | 0.301 |

As described above, the present disclosure shows that when the noble metal nanoclusters are loaded or decorated in cobalt hydroxide at high dispersion through a single-step reduction method, without using expensive iridium oxide, which has been previously reported to have the best performance, oxygen evolution reaction activity comparable to iridium oxide can be achieved. In particular, catalytic activity comparable to expensive iridium oxide-based catalysts can be obtained although a relatively low-cost noble metal is dispersed and decorated in a remarkably small amount.

According to a specific embodiment of the present disclosure, a catalyst in which a noble metal is decorated in the form of nanoclusters with high dispersion in cobalt hydroxide can improve the inefficient oxygen evolution reaction activity, which is a technical barrier in the conventional water splitting systems, to a level comparable to an expensive iridium-based catalyst. In particular, the catalyst improves economic feasibility because it provides excellent catalytic activity despite using a very small amount of noble metal. Furthermore, the noble metal nanocluster catalyst according to one embodiment enables the preparation process of a general catalyst (for example, decorated catalyst) to be remarkably simplified, for example, to be synthesized in a single step. As such, the catalyst thus prepared is used as an electrode for oxygen evolution reaction, is thus suitable for commercialization of the entire water splitting system and can create high added value. Therefore, the catalyst is expected to be widely applied in the future.

Accordingly, it should be understood that modifications and variations of the present disclosure may be easily made by those skilled in the art, and such modifications or variations may fall within the scope of the present disclosure.

What is claimed is:

1. A catalyst for an oxygen evolution reaction electrode for water splitting, the catalyst comprising:
   a nanostructure containing cobalt hydroxide; and
   noble metal nanoclusters dispersed in an amount of 0.5 to 2% by weight, based on a total weight of the catalyst, in the nanostructure.

2. The catalyst according to claim 1, wherein the cobalt hydroxide is $\beta$-$Co(OH)_2$.

3. The catalyst according to claim 1, wherein the nanostructure is a multidimensional structure in which nanosheets are assembled.

4. The catalyst according to claim 1, wherein the noble metal nanoclusters comprise at least one selected from the group consisting of rhodium, platinum and palladium.

5. The catalyst according to claim 1, wherein the noble metal nanoclusters have a size of 1 nm or less.

6. A method of preparing a catalyst for an oxygen evolution reaction electrode for water splitting, the method comprising operations:

a) adding a cobalt precursor and a noble metal precursor to an aqueous medium to prepare a precursor solution, b) converting the cobalt precursor in the precursor solution into a nanostructure containing cobalt hydroxide by use of a reducing agent to form a product in which noble metal nanoclusters are dispersed in the nanostructure; and c) recovering the product, wherein the noble metal nanoclusters are present in an amount of 0.5 to 2% by weight, based upon the weight of the catalyst.

7. The method according to claim 6, wherein operation (b) is conducted by single-step reduction.

8. The method according to claim 6, wherein the cobalt precursor comprises at least one selected from the group consisting of halides, sulfates, nitrates, phosphates, carbonates, acetates, and hydrates thereof.

9. The method of claim 6, wherein the noble metal precursor comprises at least one selected from the group consisting of halides, organic acid salts, inorganic acid salts, hydroxides, complexes, combinations thereof and hydrates thereof, wherein the noble metal comprises at least one selected from the group consisting of rhodium, platinum and palladium.

10. The method of claim 6, wherein the cobalt precursor in the precursor solution has a concentration from 50 to 200 mM and the noble metal precursor in the precursor solution has a concentration from 1 to 10 mM, and wherein a molar ratio of the noble metal precursor to the cobalt precursor ranges from 0.01:1 to 0.06:1.

11. The method of claim 6, wherein the reducing agent comprises at least one selected from the group consisting of hydrazine, ascorbic acid, sodium hydroxide, potassium hydroxide, tannic acid, dimethylformamide, tetrabutylammonium borohydride, lithium borohydride and sodium borohydride, wherein a molar ratio of the reducing agent to the total metal precursor ranges from 0.1 to 5.

12. An oxygen evolution reaction electrode for water splitting, the oxygen evolution reaction electrode comprising:

an electrode substrate; and a noble metal nanocluster catalyst loaded on the electrode substrate;

wherein the noble metal nanocluster catalyst comprises:

a nanostructure containing cobalt hydroxide, and noble metal nanoclusters dispersed in an amount of 0.5 to 2% by weight, based upon a total weight of the catalyst, in the nanostructure.

13. The oxygen evolution reaction electrode according to claim 12, wherein the oxygen evolution reaction electrode exhibits an overpotential of 0.4 V (vs. RHE) or less at a reference current density of 10 mA/cm$^2$, and a scanning rate of 5 mV/s in the presence of 1 M KOH (pH 14).

14. The oxygen evolution reaction electrode according to claim 13, wherein an amount of the noble metal nanocluster catalyst loaded on the electrode ranges from 0.02 to 0.1 mg/cm$^2$.

15. A water splitting system comprising:

an anode and a cathode as electrochemical electrodes electrically connected to an external power source; and an aqueous medium containing an electrolyte, wherein, upon application of a voltage from the external power source, oxygen is generated at the anode and hydrogen is generated at the cathode, the anode comprises a noble metal nanocluster catalyst loaded on an electrode substrate, and the noble metal nanocluster catalyst comprises (i) a nanostructure containing cobalt hydroxide, and (ii) noble metal nanoclusters dispersed in an amount of 0.5 to 2% by weight, based upon a total weight of the catalyst, in the nanostructure.

16. The water splitting system according to claim 15, wherein the aqueous medium containing the electrolyte is an alkaline medium or an acidic medium.

17. The water splitting system according to claim 16, wherein the electrolyte in the alkaline medium comprises at least one selected from the group consisting of potassium hydroxide, potassium hydrogen carbonate, potassium bicarbonate, sodium hydrogen carbonate, sodium hydroxide, and lithium hydroxide, and the electrolyte in the acidic medium comprises at least one selected from the group consisting of sulfuric acid, nitric acid, phosphoric acid, perchloric acid and hydrochloric acid.

18. The water splitting system according to claim 15, wherein the anode has an overpotential of 0.4 V (vs. RHE) or less at a reference current density of 10 mA/cm$^2$, and a scanning rate of 5 mV/s in the presence of 1 M KOH (pH 14), and the anode has a Tafel slope of 100 mV/dec or less.

19. The water splitting system according to claim 15, wherein an amount of the noble metal nanocluster catalyst loaded on the electrode substrate ranges from 0.02 to 0.1 mg/cm$^2$.

20. A catalyst comprising:

a nanostructure including a plurality of nanosheets; and noble metal nanoclusters dispersed in the nanostructure, wherein the nanostructure contains cobalt hydroxide, and wherein a weight of the noble metal nanoclusters is 0.5 to 2% by weight of a total weight of the catalyst.

\* \* \* \* \*